June 11, 1940.                H. E. METCALF                2,204,096
                        UNITARY SIGNAL SWITCH
                        Filed Dec. 27, 1938            3 Sheets-Sheet 1

INVENTOR.
HERBERT E. METCALF
BY
Lippincott & Metcalf
ATTORNEYS.

June 11, 1940.  H. E. METCALF  2,204,096
UNITARY SIGNAL SWITCH
Filed Dec. 27, 1938  3 Sheets-Sheet 2
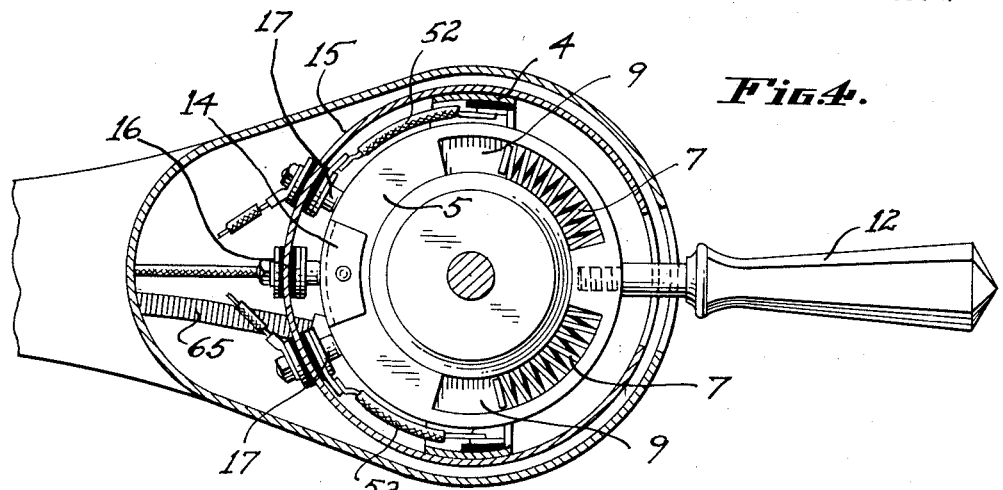
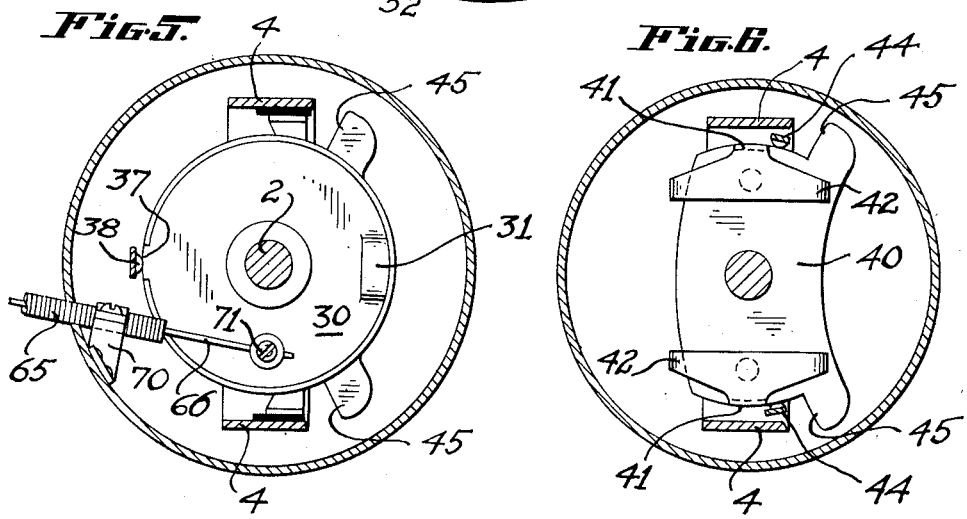
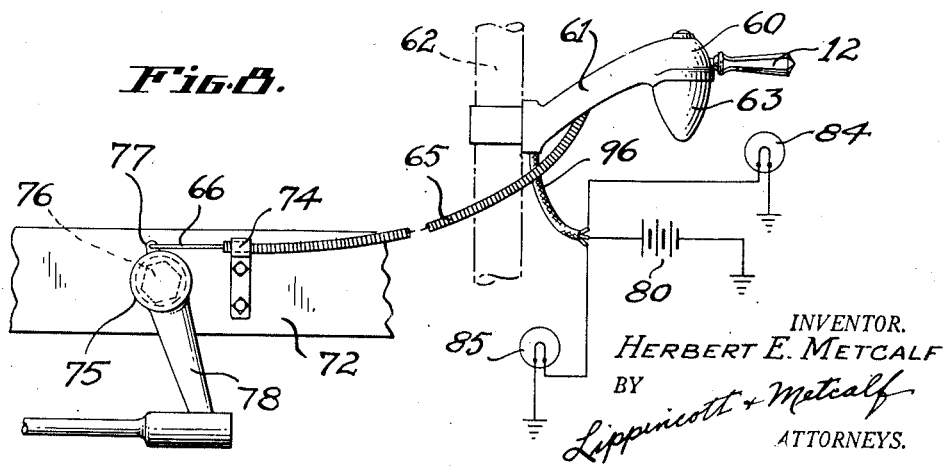
INVENTOR.
HERBERT E. METCALF
BY
Lippincott + Metcalf
ATTORNEYS.

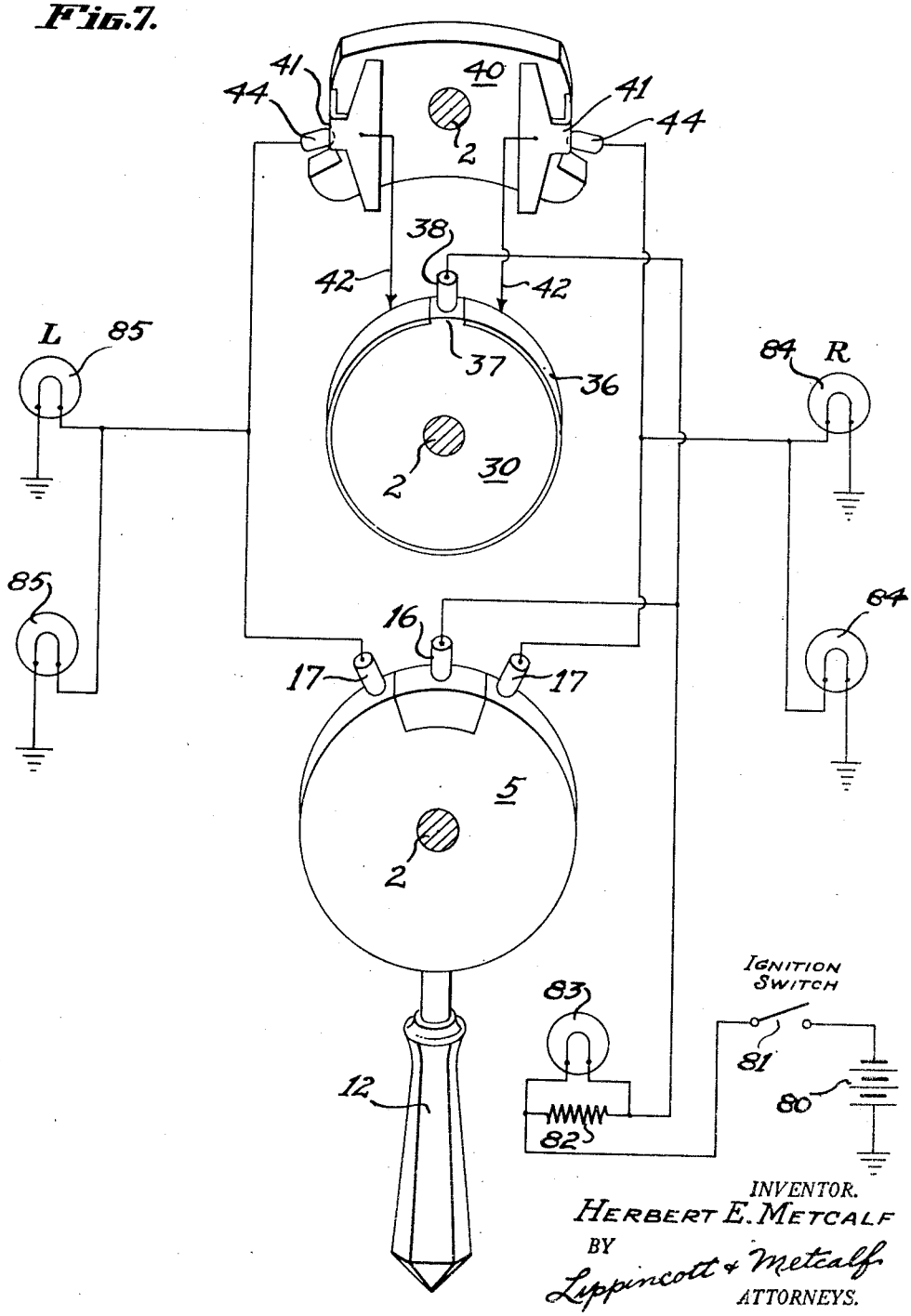

Patented June 11, 1940

2,204,096

UNITED STATES PATENT OFFICE 2,204,096

UNITARY SIGNAL SWITCH

Herbert E. Metcalf, Walnut Creek, Calif., assignor to E. H. Kueffer, Oakland, Calif.

Application December 27, 1938, Serial No. 247,815

2 Claims. (Cl. 200—59)

My invention relates to a unitary signal switch and system, and more particularly to such a device adapted for use as an automotive signal control.

Among the objects of my invention are: To provide a unitary switch for use in conjunction with signalling devices on a vehicle to give both manual and automatic turning signals; to provide a unitary switch adapted to give both manual and automatic control of vehicle direction signalling circuits; to provide a combined automatic and manual switch for a vehicle signalling system; to provide an automatic switch for a vehicle signalling system or the like utilizing a flexible connection to the steering gear of the vehicle; to provide a unitary switch operated by flexible connection to the steering gear of a vehicle which will both automatically and manually energize right and left signalling circuits; to provide a manual switch positioned within reach of the operator of a vehicle which may be used to preset a signal in advance of a vehicle turn, and which will be automatically centralized when a turn has been made; to provide a vehicle signalling system, including a manual switch automatically released from a holding position by a flexible connection to the steering gear of the vehicle; to provide a vehicle signalling switch adapted for use in conjunction with right and left turn signalling devices, which can be preset in advance of a turn and returned to central position when a turn is made, without disturbing the continuity of the preset signal; to provide a vehicle signalling switch which will automatically correct erroneous preset signals; and to provide a simple, unitary signalling switch for vehicle signalling systems.

Other objects of my invention will be apparent or will be specifically pointed out in the description forming a part of this specification, but I do not limit myself to the embodiment of the invention herein described, as various forms may be adopted within the scope of the claims.

Referring to the drawings:

Fig. 4 is a view partly in elevation and partly in section, taken as indicated by the line 4—4 in Fig. 1.

Fig. 5 is a view partly in section and partly in elevation, taken as indicated by the line 5—5 in Fig. 1.

Fig. 6 is a view partly in section and partly in elevation, taken as indicated by the line 6—6 in Fig. 1.

Fig. 7 is a schematic wiring diagram of the switch shown in the previous figures.

Fig. 8 is a diagram showing how the switch of my invention may be installed for operation on a vehicle.

Figure 1:
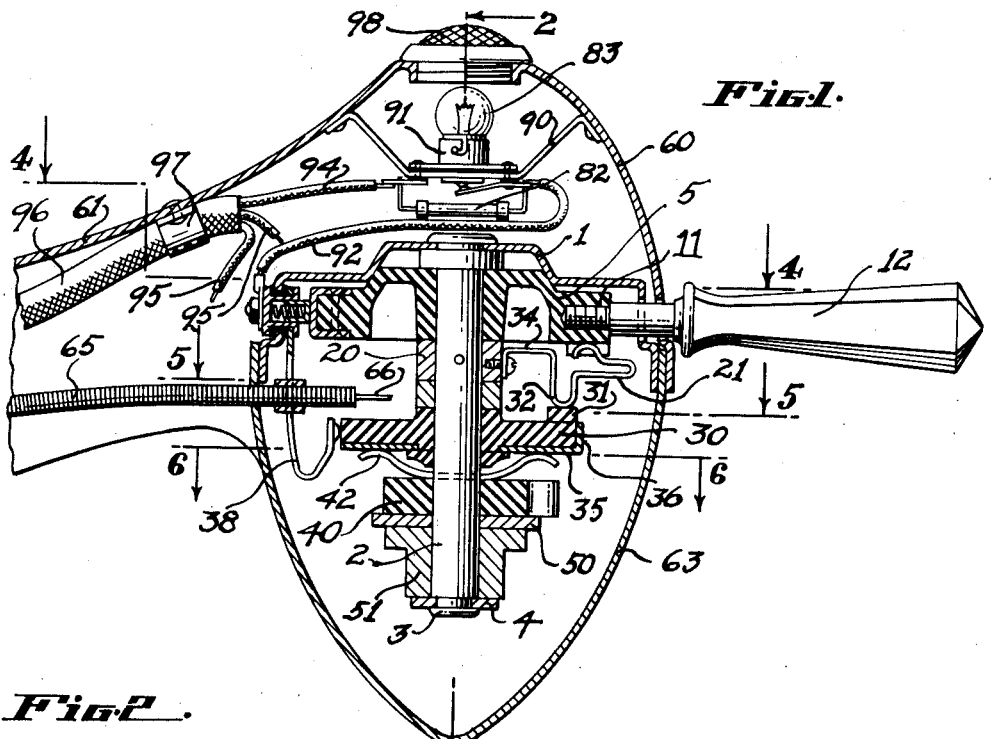
Fig. 1 is a longitudinal sectional view of one preferred embodiment of my invention.
Figure 2:
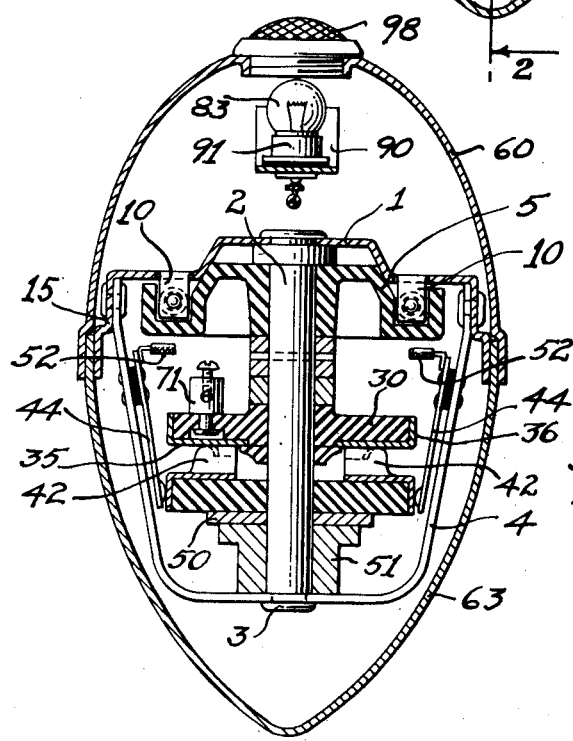
Fig. 2 is a longitudinal sectional view of the device shown in Fig. 1, taken as indicated by the line 2—2 in Fig. 1.
Figure 3:
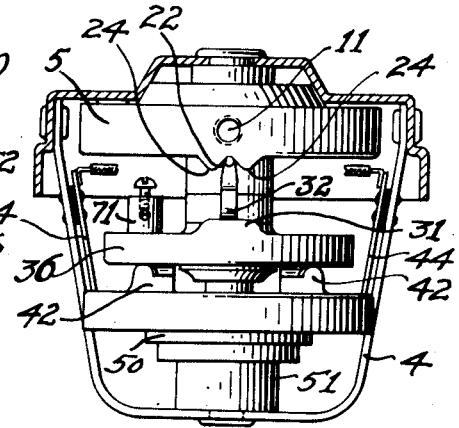
Fig. 3 is a front view in elevation of the switch discs shown in Figs. 1 and 2.

Referring directly to the drawings for a more detailed description of my invention, a foundation member 1 is provided, of inverted cup shape, which carries a central shaft 2. The far end 3 of shaft 2 is stabilized by attachment to a U-shaped subframe 4. Directly below foundation member 1 is positioned a manual disc 5, preferably molded of insulating material, this disc 5 being maintained in a predetermined central position by the opposition of return springs 7 positioned in arcuate recesses 9 in disc 5. The springs 7 are stabilized by contact at one end thereof with spring ears 10, kicked down from foundation member 1. Midway between the two springs a socket 11 is provided, into which a handle 12 may be screwed.

Opposite handle socket 11 a manual disc contact 14, segmental in shape, is positioned, and the side wall 15 of foundation member 1 carries a central manual brush 16 and two lateral manual brushes 17. Central brush 16 is always in contact with manual contact 14, and lateral brushes 17 are just out of contact therewith when the handle 12 is in central position. However, when handle 12 is moved to left or right, manual contact 14 will connect the central brush 16 with one or the other of the lateral brushes 17. Under ordinary circumstances, and in the preferred circuit which will be described later, the central brush 16 is attached to a power source and the lateral brushes are attached to right and left lamps or other signalling devices, respectively.

Manual disc 5 is held in place on the shaft by a fixed spring collar 20, and this spring collar carries a compound spring 21, the free end of which is recurved to enter a central notch 22 on the lower surface of disc 5. The bottom of notch 22 is preferably at a level with the remainder of the lower surface of disc 5 so that latch projections 24 are provided, one on each side of central notch 22. If, therefore, the pressure of compound spring 21 is exerted upwardly, when the handle 12 of the manual disc is moved to right or left the end of compound spring 21 will fall behind one or the other of latch projections 24, and the handle will stay in the right or left position. In this position, however, the manual disc 5 has been moved far enough to cause central brush 16 to contact one or the other of lateral brushes 17.

However, compound spring 21 does not always exert an upward pressure, and I have provided means to release this upward pressure under predetermined conditions so that compound spring 21 will no longer maintain the manual disc 5 in right or left position, but will release it to return to a central position under the urge of whichever one of return springs 7 is compressed. I accomplish the release of the manual disc from its contact making positions by the use of an automatic disc 30, positioned on shaft 2 below disc 5 and below spring collar 20.

Automatic disc 30 is provided on its top surface with a cam projection 31 which bears against a cam portion 32 of compound spring 21, so that when cam portion 32 is riding on the cam projection 31 of disc 30, the end of compound spring 21 will exert pressure against the latch portions 22 and 24 of disc 5. When, however, automatic disc 30 is rotated to right or left, a spring set tending to force the spring downwardly, previously given to basal portion 34 of compound spring 21, forces the end of compound spring 21 to drop, thereby releasing the manual disc and allowing it to return to central position if it has been previously turned. The driving means for automatic disc 30 will be described later.

Automatic disc 30 is also provided, on its lower surface, with an annular metal plate 35 which is rolled over the periphery to form a peripheral slip ring 36, this slip ring being interrupted by an insulating segment 37 at a point preferably directly beneath segmental contact 14 on the manual disc 5, and a central automatic brush 38 bears against the periphery of disc 30, riding on the insulated segment 37 at all times when cam portion 32 of the compound spring 21 is on cam projection 31 of automatic disc 30. This brush 38 is directly connected to central manual brush 16 bearing on the manual disc.

Frictionally driven from automatic disc 30, and positioned directly below disc 30, is an oscillating disc 40 having lateral contacts 41 on the periphery thereof, these contacts being extended into clutch springs 42 bearing against annular plate 35 on the automatic disc 30. Right and left signalling brushes 44 are provided in the path of lateral contacts 41 on oscillating disc 40, and may be conveniently attached to subframe 4, but these brushes 44 are positioned both on the same side of the diameters of disc 40 passing through brushes 41. Due to the clutch action of springs 42, oscillating disc 40 will rotate with automatic disc 30 until stops 45 extending from oscillating disc 40, touch subframe 4, and thereafter the clutch springs 42 will slip on plate 35, with only one of contacts 41 in contact with signalling brushes 44 at any one time in accordance with direction of rotation.

Oscillating disc 40 is held on shaft 2 by thrust washer 50, maintained in position by an end plate 51 mounted on subframe 4 and shaft 2. Connecting wires 52 are provided inside the switch to connect lateral signalling brushes 44 with lateral brushes 17.

Foundation member 1 is attached to an upper half 60 of a casing, and this upper half is supported by casing extension 61 which may be conveniently extended to clamp on a steering post 62, or similar support, and the remainder of the switch is covered with a lower half 63 of the casing, the upper and lower halves cooperating to form a complete case of pleasing configuration.

In order to drive automatic disc 30 in synchronism with the steering gear of an automobile, I provide a "Boden" cable which comprises a flexible outer sleeve 65 and a flexible inner driving wire 66, the inner wire sliding smoothly within sleeve 65. At the switch end, sleeve 65 may be attached in any convenient manner to lower half 63 of the casing by a sleeve bracket 70 to hold sleeve 65 at a proper angle with respect to disc 30, so that inner wire 66 may extend tangentially across the surface of disc 30 and be attached thereto by a swivel stud 71. As inner wire 66 slides in sleeve 65, automatic disc 30 will be rotated. Thus, sleeve 65 may conveniently be brought out, away from the switch assembly within extension 61, as shown in Fig. 8, and the free end of the "Boden" cable may then be attached to the vehicle so as to be operated by rotation of the steering gear.

One manner in which this may be accomplished is shown in Fig. 8, where the sleeve 65 is stabilized to the frame 72 of a vehicle by a vehicle sleeve bracket 74, leaving the free end of the central wire 66 extending beyond the free end of sleeve 65. A fitting 75 is then provided and attached over the quadrant nut 76 of the vehicle, the fitting 75 being provided with a driving stud 77 engaging the free end of wire 66. Thus, as the Pitman arm 78 of the steering gear is rotated by rotation of the quadrant nut, wire 66 will be caused to slide within sleeve 65, thereby rotating automatic disc 30 in synchronism with turning of the vehicle.

There is, therefore, contained in the single switch structure above described, a manually rotatable disc and automatically rotatable discs, and the manner in which I connect the unitary switch to a signalling system is shown in Fig. 7.

Inside the switch I have described above, central brush 16 on the manual disc 5 is connected to central brush 38 on automatic disc 30. Likewise, lateral signalling brushes 44 contacting oscillating disc 40 are connected to lateral brushes 17 on the manual disc. In connecting the switch for operation, central brushes 16 and 38, being connected together, are connected to power source 80 through ignition switch 81, and if a pilot light is desired, through pilot resistor 82 bridged by pilot lamp 83. Lateral brushes 17 and 44 are connected on one side to right signalling lamps 84 and on the other side to left signalling lamps 85, the circuit being completed through the ground of the vehicle, as is the usual custom.

In connecting the automatic disc 30 to the steering gear of the vehicle, the connection is made so that when the vehicle has its front wheels positioned straight ahead, which would cause the vehicle to proceed on a straight-ahead course, automatic disc 30 has central brush 38 contacting insulating segment 37 slightly to the left of center. This unequal set-up is used because left hand turns are usually of a longer radius than right hand turns. If we then assume that the vehicle is proceeding in a straight-ahead course, it will be seen that with the handle 12 and the manual disc 5 in the central position, there will be no energization of any circuit, irrespective of the position of oscillating disc 40, because insulating segment 37 on automatic disc 30 prevents any current from flowing to left or right lamps through the automatic disc and oscillating disc.

Furthermore, under these conditions cam 31 on automatic disc 30 is holding the end of compound spring 21 in central notch 22 of the manual disc. If, then, it is desired to preset a turn, the manual switch handle 12 is moved against the pressure of compound spring 21, and when the handle is moved a sufficient distance to cause the end of compound spring 21 to ride on the far sides of latch projections 24, the manual disc will stay in current-making condition and therefore current from source 80 will pass to either right or left lamps in accordance with the direction handle 12 has been moved. All current for the right lamps must necessarily pass through pilot resistor 82, and the drop across this resistor is utilized to light pilot light 83. If one of the lamps on a side is burned out the drop in resistor 82 will be insufficient to light lamp 83, thus giving warning to the operator that one or the other of the signalling lamps on a side is out of commission.

Assuming, however, that both lamps are lit and everything is in good order, the vehicle then approaches the turn with the signalling lights on the side indicating that turn, illuminated. The turn is then made, and as the vehicle is turned the steering gear must of necessity have been turned, and this causes automatic disc 30 to turn. As automatic disc 30 turns, and if the turn is sufficiently sharp, two things happen simultaneously, or practically so. First, cam 31 on the automatic disc passes out from beneath compound switch 21, allowing the spring to drop down and release the manual disc 5 to central position. At the same time central brush 38 contacts peripheral ring 36 of the automatic switch, oscillating disc 40 has rocked to connect the signal on the side toward which the car is turning, to the peripheral ring 36 through contact 41 and clutch spring 42, thereby continuing the signal on the side toward which the vehicle turned.

Properly coordinated, the release of the manual disc 5 will take place just as the automatic disc 30 and oscillating disc 40 connects the proper lamp in a turn, so that the signal will be continued until the reverse of the turn toward the straight-away is made. If the turn is reversed before brush 38 contacts insulating segment 37 on automatic disc 30, then the opposite light will light, due to the rocking of the oscillating disc, showing that a reverse turn is being made. All indication, however, will stop on either side after the vehicle returns to the predetermined no-signal angle, because brush 38 will then be upon insulating segment 37.

It may be assumed that occasionally the manual disc 5 is used to set up a turn, for example, to the right, but the actual turn, due to circumstances, is made to the left. Under these conditions the manual disc 5 is released as soon as the automatic disc 30 has been rotated, so that compound spring 21 drops off from cam 31, thereby putting out the right lights. At the same time, however, the automatic disc has caused the oscillating disc to rotate in the proper direction, and the left lights will go on as soon as brush 38 is in contact with slip ring 36 on the automatic disc. Thus, at the beginning of the turn the erroneous hand disc set up is wiped out and the proper turn automatically indicated.

It will be noted that I have shown the preferred circuit as utilizing a pilot resistor 82 and a pilot light 83. I have found that it is convenient to position this pilot light in the upper half 60 of the switch casing as the space therein is not otherwise being utilized. I do this by providing a pilot frame 90 carrying a lamp socket 91 into which the pilot light 83 may be positioned. Immediately below the bracket is positioned resistor 82, and connecting wire 92 is utilized to connect one end of the resistor and lamp to central brushes 16 and 38. Main power lead 94 and lamp leads 95 may be combined into a cable 96 fastened by a clamp 97 inside of extension 61 from upper half 60 of the casing. In order that the pilot lamp may show over a wide angle, I provide a jewel 98 in the top of the casing through which the pilot light may be seen by the operator of the vehicle.

It will thus be seen that I have provided a compact, unitary switch having both manual and automatic operation, the automatic operation cooperating with the manual operation to the end that all manual settings are automatically returned to neutral when a turn is made, irrespective of the fact whether the preset signal is correct or erroneous.

It should also be noted that the release of the manual indication in no way disturbs the continuity of the signal, because as the manual setting is released the automatic setting takes over the operation of the indicators, and in this respect it will be noted that while I have shown signal lamps as being the indicating devices preferred, my invention is in no way limited to the use of lamps as other electrically operated devices are fully equivalent.

I claim:

1. A vehicle signalling switch comprising a hollow casing, a support for said casing, a stationary axle in said casing, a manual disc mounted to rotate on said axle, arm means projecting through said casing for rotating said manual disc over a predetermined arc, make and break means operated by movement of said manual disc to either end of said arc, resilient means for centering said manual disc and said arm in said arc, a mechanical latch cooperating with said manual member to hold said member in position at either end of said arc and mounted on said axle, an automatic disc mounted on said axle and cooperating with said mechanical latch to release said manual member after a predetermined arc of rotation in either direction, an oscillating member mounted on said shaft adjacent said automatic disc, a friction clutch connecting said oscillating member and said automatic disc, means for limiting the rotation of said oscillating member and make and break means operated by movement of said positively rotated member and said oscillating member.

2. Apparatus in accordance with claim 1, wherein a flexible tube is stabilized by attachment to said casing, said flexible tube having a flexible wire sliding therein and tangentially engaging said automatic disc, the other end of said wire being left free for attachment to the steering gear of a vehicle.

HERBERT E. METCALF.